United States Patent [19]

Hawley et al.

[11] Patent Number: 5,276,114
[45] Date of Patent: Jan. 4, 1994

[54] OLEFIN POLYMERIZATION CATALYST AND POLYMERIZATION PROCESS

[75] Inventors: Gil Hawley, Dewey; Max McDaniel, Bartlesville, both of Okla.; Simon Kukes, Naperville, Ill.

[73] Assignee: Phillips Petroleum Company, Bartlesville, Okla.

[21] Appl. No.: 49,482

[22] Filed: Apr. 19, 1993

Related U.S. Application Data

[62] Division of Ser. No. 808,782, Dec. 16, 1991, Pat. No. 5,231,065.

[51] Int. Cl.$^5$ ............................................. C08F 4/70
[52] U.S. Cl. ............................. 526/115; 526/113; 526/114; 526/351; 526/352; 502/113
[58] Field of Search ................... 526/113, 114, 115

[56] References Cited

U.S. PATENT DOCUMENTS 5,024,982 6/1991 Hawley et al. ................... 502/110

Primary Examiner—Joseph L. Schofer
Assistant Examiner—David Wu
Attorney, Agent, or Firm—Beverly M. Dollar

[57] ABSTRACT

A method for making polymerization catalysts is disclosed which comprises contacting a soluble complex prepared from the combination of a metal dihalide and a transition metal compound with a particulate material comprising zirconium phosphate and then reacting the resulting mixture with an organoaluminum halide to produce a catalyst precursor. The catalyst precursor is then contacted with a halogen containing compound selected from halides of Groups IVA and VA to produce the catalyst. Novel catalysts prepared in accordance with the invention method, novel polymerization processes therewith and novel polymers having relatively high melt flow rates while retaining good mechanical strength are also disclosed.

9 Claims, 4 Drawing Sheets

OLEFIN POLYMERIZATION CATALYST AND POLYMERIZATION PROCESS

CROSS-REFERENCE TO RELATED APPLICATION

This application is a division of prior application, Ser. No. 07/808,782, filed Dec. 16, 1991, now U.S. Pat. No. 5,231,065.

Field of the Invention

This invention relates to a process for forming catalysts which can be used with a cocatalyst to form a catalyst system for the polymerization of α-olefins. In one aspect, the present invention relates to novel polymerization catalysts. In another aspect, the present invention relates to a process for polymerizing α-olefins. In yet another aspect, this invention relates to novel polymers of α-olefins.

BACKGROUND OF THE INVENTION

The polymerization of α-olefins and mixtures thereof at low pressures is known to be promoted by coordination catalysts prepared from mixtures of compounds of (a) transition elements, and (b) organometallic compounds of elements of Groups IA to IIIA of the Periodic Table. Such polymerizations can be carried out in suspension, in solution, in the gas phase, and the like.

Because of favorable process economics, especially with low molecular weight olefins such as ethylene and propylene, it is frequently desirable to carry out olefin polymerization or copolymerization reactions in an inert diluent at a temperature at which the resulting polymer or copolymer does not go into solution; and where the polymer product is recovered without removing the polymerization catalyst. Thus, elaborate steps to remove catalyst from the polymer product are avoided. In order for this more economical method of polymer manufacture to be practical, the polymerization catalyst employed must be capable of producing polymer in high productivities in order to maintain the residual catalyst level in the final polymer at a very low level. Thus, the activity of an olefin polymerization catalyst is one important factor in the continuous search for catalysts useful for the polymerization of α-olefins. It is also desirable to produce polymer particles which are characterized by high crush or attrition resistant strength, uniformity of size, and a relatively low level of fine particulate matter. Although polymer fluff having relatively high percentages of polymer fines can be handled with plant modifications, the production of polymers in high productivity with low level of fines content is highly desirable so as to avoid the need for such plant modifications.

For certain applications of the polymer, such as for example injection molding, it is desirable that the polymer exhibit easy processibility, characterized by a high melt flow rate. Often the achievement of a high flow rate results in detriment to the mechanical properties of the polymer, e.g., the strength of molded parts made from the polymer is reduced.

It would therefore be desirable to produce a polymer which has a high melt flow rate and yet still retains strength during and after processing.

OBJECTS OF THE INVENTION

It is an object of the present invention, therefore, to provide a novel and improved method for preparing catalyst compositions.

Another object of the present invention is to provide a novel catalyst composition well adapted for the polymerization of α-olefins.

Another object of the present invention is to provide an improved process for the polymerization α-olefins.

Yet another object of this invention is to provide polymer compositions having relatively high melt flow rates while retaining strength during and after processing.

These and other objects of the present invention will become apparent from the disclosure, figures, and claims herein provided.

STATEMENT OF THE INVENTION

In accordance with the present invention, we have discovered that polymers which exhibit relatively high melt flow rates while retaining good mechanical properties are obtained when prepared by polymerization of α-olefins with high activity, high stereospecificity heterogeneous olefin polymerization catalysts prepared by contacting a soluble complex (produced by contacting a metal dihalide with a transition metal compound) with a particulate material comprising zirconium phosphate prior to contacting with an organoaluminum halide. After treatment with the organoaluminum halide the resulting catalyst precursor is activated for polymerization by treatment with an activating agent comprising Group IVA, IVB, or VB halides.

The invention catalyst can be used with various cocatalyst components to form a polymerization system. By varying components of the system and the amount of hydrogen employed in the polymerization, a variety of polymers having different melt flows and molecular weight distributions can be produced.

DETAILED DESCRIPTION OF THE INVENTION

Figure 1:
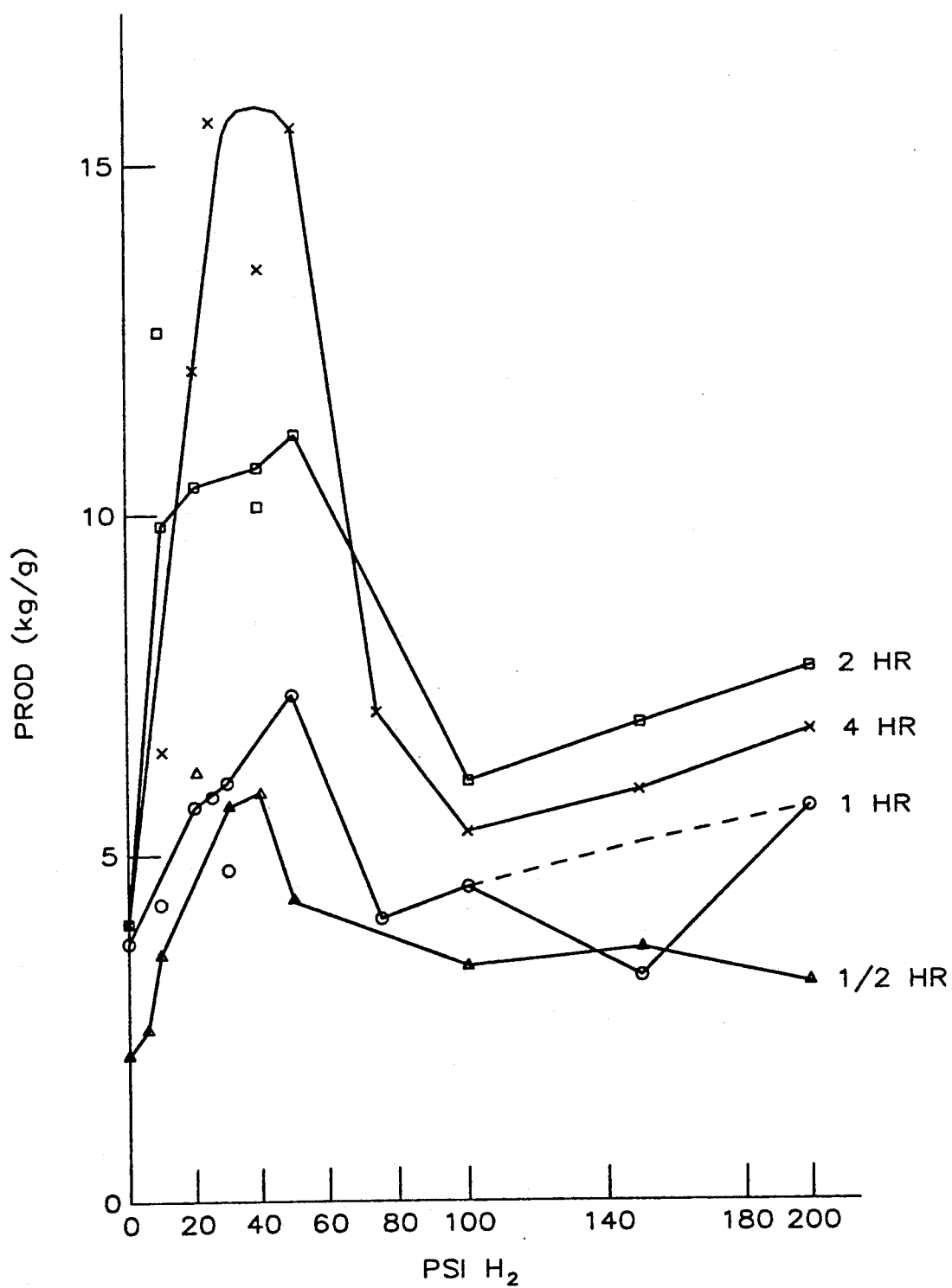
FIG. 1 graphically depicts the relationships between polymerization time and invention catalyst productivity and between the amount of hydrogen employed in the polymerization and invention catalyst productivity.

In accordance with the present invention, there is provided a method for the preparation of an olefin polymerization catalyst which comprises:

(a) contacting at least one metal dihalide selected from the group consisting of Group IIA and IIB dihalides with at least one transition metal compound in the presence of a diluent under conditions suitable for the formation of a soluble complex;

(b) contacting the soluble complex produced in accordance with step (a) with a particulate material comprising zirconium phosphate to produce a first mixture;

(c) contacting said first mixture with an organoaluminum halide to produce a catalyst precursor;

(d) contacting, the catalyst precursor with a Group IVA, IVB, or VB halide to activate the catalyst. The catalyst can also be further contacted with a cocatalyst, if desired.

Further in accordance with the present invention, there are provided novel catalyst compositions produced as described hereinabove.

Still further in accordance with the present invention there is provided a process for the polymerization of α-olefins having 2–20 carbon atoms which comprises contacting at least one of said α-olefins under polymerization conditions with catalyst prepared as described hereinabove.

Still further in accordance with the present invention there is provided a polymerization process using the invention catalyst in which catalyst productivity is optimized by employing an optimum amount of hydrogen.

Still further in accordance with the present invention, there are provided novel polymer compositions produced through the employment of the novel catalyst which exhibit relatively high melt flow rates while retaining good mechanical properties.

Examples of Group IIA and IIB metal dihalides that can be used in forming the first component of the catalyst include, for example, the dihalides of beryllium, magnesium, calcium, and zinc. Dichlorides are preferred. Magnesium dichloride is presently preferred because it is readily available and relatively inexpensive and has provided excellent results. While the hydrous or anhydrous form of the metal dihalide can be employed as the starting material for the catalyst; the amount of water in the metal dihalide should be from about 0.5 to about 1.5 moles/mole magnesium dihalide prior to contacting the dihalide with the transition metal compound. Any method known to those skilled in the art to limit the amount of water in the magnesium dihalide can be employed. It is preferred to admix the appropriate amount of water with the anhydrous metal dihalide to achieve the ratios set out above.

The metal dihalide component is generally used in the form of a particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention. Such additional preparation of the metal halide compound promotes the reaction of the metal halide compound with the transition metal compound. It does not appear, however, to be critical that the metal dihalide compound is in a fine particulate form, since catalyst productivity does not seem to be a function of the size of the particles of the metal halide compound employed.

The transition metal compounds useful in this invention are those wherein the transition metal is selected from the Groups IVB and VB and the transition metal is bonded to at least one atom selected from the group consisting of oxygen, nitrogen, and sulfur; and said oxygen, nitrogen, and sulfur atoms are in turn bonded to a carbon of a carbon-containing radical.

The transition metal is preferably selected from titanium, zirconium, and vanadium, although other transition metals can be employed. Excellent results have been obtained with titanium compounds and they are therefore preferred. Some of the titanium compounds suitable for use in the instant invention include but are not limited to, titanium tetrahydrocarbyloxides, titanium tetraimides, titanium tetraamides and titanium tetramercaptides. Other transition metal compounds include, for example, zirconium tetrahydrocarbyloxides, zirconium tetraimides, zirconium tetraamides, zirconium tetramercaptides, vanadium tetraamides, and vanadium tetramercaptides.

The titanium tetrahydrocarbyloxides are preferred because they produce excellent results and are readily available. Preferred titanium tetrahydrocarbyloxide compounds include those expressed by the general formula Ti(OR)$_4$, wherein each R is individually selected from an alkyl, cycloalkyl, aryl, alkylaryl, and arylalkyl hydrocarbon radical containing from about 1 to about 20 carbon atoms per radical. Titanium tetrahydrocarbyloxides in which the hydrocarbyl group contains from about 1 to about 10 carbon atoms per radical are more frequently employed because they are more readily available. Suitable titanium tetrahydrocarbyloxides include, for example, titanium tetramethoxide, titanium dimethoxidediethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyoxide and titanium tetraphenoxide.

Of the titanium tetrahydrocarbyloxides, titanium tetraalkoxides are generally preferred and titanium tetra-n-butoxide is particularly preferred because of the excellent results obtained employing this material. Titanium tetra-n-butoxide is also generally available at a reasonable cost.

The molar ratio of the transition metal compound to the metal dihalide compounds can be selected over a relatively broad range. Generally the molar ratio is within the range of about 10:1 to about 1:10, however, the preferred range is about 2:1 to about 1:2. When titanium tetrahydrocarbyloxide and magnesium dichloride are employed, the molar ratio of titanium to magnesium of about 1:2 is most preferred.

The metal halide compound and the transition metal compound employed in the present invention are normally mixed together by heating, e.g., refluxing, in a suitable dry (essential absence of water) solvent or diluent, that is essentially inert to these components and the product. The term "inert" is used to mean that the solvent does not chemically react with the dissolved components or the product once formed. Such inert solvents or diluents include, for example, n-pentane, n-heptane, methylcyclohexane, toluene, xylenes, and the like. Aromatic solvents are preferred, such as for example xylene, because the solubility of the metal dihalide compound and the transition metal compound are higher in aromatic solvents than in aliphatic solvents, particularly at low temperatures. Such mixing temperatures are generally within the range of from about 0° C. to about 50° C. and preferably from about 10° C. to about 30° C.

Mixtures of two or more of the above solvents to dissolve the reagents of the first catalyst component can also be used and can be readily determined by one of ordinary skill in the art.

Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Higher heating temperatures can be employed if the pressure employed is above atmospheric pressure.

Generally, the time required for heating these two components together is within the range of about 5 minutes to about 10 hours, although in most instances a time within the range of about 15 minutes to about 3 hours is sufficient. Following the heating operation, the resulting solution can be filtered if desired to remove any undissolved material or extraneous solids.

In one embodiment of the present invention, it has been found that very useful catalyst components result if a third component or set of components is included during the reaction of the metal dihalide and the transition metal compound. Many combinations of third components and specific transition metal compounds provide significant improvements in either productivity or selectivity for the more desirable insoluble polymer product.

Examples of compounds suitable for use as third components include electron donors such as ammonia, hydroxylamine, alcohols, ethers, carboxylic acids, esters, acid chlorides, amides, nitriles, amines, phenols, naphthols, and their sulfur-containing analogs, i.e., thiophenols. The preferred compounds are aromatic compounds selected from the group consisting of phenols, thiophenols, naphthols, aralkyl alcohols, aromatic acids, and aromatic esters.

The molar ratio of third component compound employed in step (1) relative to the transition metal compound can vary from about 5:1 to about 1:5, preferably about 1:1 to 2:1.

The term "phenol" is used herein to refer to substituted as well as unsubstituted phenols. Typical examples include phenol, O-methyl phenol, n-methyl phenol, p-methyl phenol, 4-phenyl phenol, O-fluorophenyl, m-fluorophenol, p-fluorophenol, p-sec-butylphenol, p-ethyl phenol, p-isopropyl phenol, p-tert-butyl phenol, p-methoxy phenol, p-cyanophenol, and p-nitrophenol. The term aromatic ester is used generally to include substituted as well as unsubstituted aromatic esters. Typical examples include ethyl benzoate, ethyl p-methoxybenzoate, ethyl toluate, ethyl p-butoxybenzoate, and butyl benzoate. The preferred aromatic esters are those having 8 to 12 carbon atoms per molecule.

When an ester and a phenol are employed, typically the sum of the moles of those two electron donors to the moles of the transition metal compound are in the range of about 5:1 to 1:5, more preferably 3:1 to 2:1.

The dihalides and the transition metal compounds and electron donors, when employed, can be reacted in the presence of a liquid diluent or solvent; or when at least one of the reagents is in the liquid state during the reaction, the use of a diluent can be omitted.

In accordance with the present invention, the soluble complex prepared as described above is then contacted with a particulate material comprising zirconium phosphate to form a first mixture of said soluble complex and said zirconium phosphate. As used herein, the term phosphate includes orthophosphates, pyrophosphates, metaphosphates, and polyphosphates. For convenience, hereinafter these phosphates will be collectively represented by the formula "$ZrPO_4$".

The $ZrPO_4$ can be prepared by any suitable method. Coprecipitation is the preferred method, for example, the $ZrPO_4$ can be prepared by coprecipitating any suitable zirconium salt with any suitable phosphate. The coprecipitation can be carried out in any suitable solvent such as water or alcohol with water being the preferred solvent. The metal salts and the phosphate must be soluble in the solvent used to be suitable.

If a phosphate such as diamonium phosphate is utilized, the pH of the solution will generally be such that precipitation will occur. However, if other phosphates are used, it may be necessary to add a base such as ammonia to achieve a pH which will result in the desired precipitation.

The precipitant formed is typically washed, dried, and calcined in the presence of a free oxygen containing gas such as air to form the $ZrPO_4$.

The drying of the precipitant may be accomplished at any suitable temperature. Generally a temperature of about 20° C. to about 200° C., preferably about 100° C. to about 150° C., is utilized for a time in the range of about 1 hour to about 30 hours.

The calcining step can be utilized to remove traces of nitrates, traces of carbon, and water and to make the structure of the $ZrPO_4$ composition harder. Any suitable calcining temperature can be utilized. Generally, the calcining temperature will be in the range of about 100° C. to about 900° C. with a temperature in the range of about 300° C. to about 600° C. being preferred for a time in the range of about 1 to about 24 hours, preferably about 2 to about 6 hours.

The $ZrPO_4$ can have any suitable surface area and pore volume. In general, the surface area will be in the range of about 2 to about 400 $m^2/g$, preferably about 10 to about 200 $m^2/g$, while the pore volume will be in the range of about 0.2 to about 4.0 cc/g, preferably about 0.4 to about 2.0 cc/g.

Any suitable phosphates may be utilized to prepare the $ZrPO_4$. Suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, rubidium, and cesium, and $H_3PO_4$. Phosphonic acids such as phenyl phosphonic acids and the metal salts of phosphonic acids may also be used to derive phosphates for the catalyst composition if desired.

Any suitable zirconium to phosphorus ratio may be used. The ratio will generally be about stoichiometric.

The $ZrPO_4$ containing material can optionally include other transition metals selected from Groups IVB-VIB, VIII, IB, and IIB of the Periodic Table, for example Fe, Co, Ni, Cu, and Zn. Preferred metals are Fe, Ni, and Cu; most preferred is Ni. The molar ratio of the metal component to Zr in the $ZrPO_4$ containing particulate material is generally in the range of 0.0:1 to 10:1. When Ni is chosen as the metal component, the molar ratio is preferably 0.25:1 to 5:1.

The additional metal components are preferably added by coprecipitation during the formation of the $ZrPO_4$. A suitable metal salt can be added with the zirconium salt and suitable phosphate in any order.

It has also been discovered that the activity of the final catalyst can be increased for propylene polymerization by forming the $ZrPO_4$ in the presence of sulfate ions. Any suitable source of sulfate ions can be employed. It is presently preferred to use ammonium sulfate to provide the sulfate ions.

The amount of sulfate ions employed is generally within the molar ratio of sulfate ions to Zr ions of about 0.1:1 to 10:1.

The quantity of particulate material comprising $ZrPO_4$ employed in the practice of the present invention, based on the weight of initial metal dihalide employed, can vary over a wide range. Generally, the weight ratio of $ZrPO_4$ containing particulate material to metal dihalide can range from about 0.05:1 up to about 25:1, with ratios in the range of about 1:1 to 10:1 preferred.

The desired quantity of $ZrPO_4$ containing material is added to the soluble complex once preparation of the soluble complex is complete. The combination of $ZrPO_4$ material and soluble complex is then stirred at any suitable temperature for any suitable period of time. Generally, the contacting takes place from in the range of about 5 minutes up to 2 hours at a temperature in the range of about 20° up to 100° C., before further treatment of the first mixture with an organoaluminum halide as described below.

The organoaluminum halide is selected from compounds having the general formula $AlR_nX_{3-n}$ wherein each R is individually selected from saturated and unsaturated hydrocarbyl radicals containing 1 to 20 carbon atoms per radical, X is a halogen and n is any number such that $1 \leq n \leq 2$. Typical examples include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-p-propylaluminum bromide, di-n-octylaluminum bromide, diphenylaluminum chloride, triethylaluminum, dicyclohexylaluminum bromide, dieicosylaluminum chloride, methylaluminum sesquibromide, ethylaluminum, sesquichloride, ethylaluminum sequiiodide and mixtures thereof. Ethylaluminum sesquichloride, ethylaluminum dichloride, and diethylaluminum chloride have been employed with good results and are preferred. The most preferred organoaluminum halide is ethylaluminum sesquichloride.

The reaction with the organoaluminum halide can also be carried out either in the presence of a liquid diluent or in the absence of such diluent, when at least one of the reagents is in the liquid state. Preferably, the first mixture is contacted with a hydrocarbon solution of the organoaluminum halide.

The temperature employed while mixing the first mixture and organoaluminum halide as above-described can be selected over a broad range. Generally the temperature employed is within a range of about 0° C. to about 50° C. or higher, while temperatures within the range of 20° C. to about 30° C. are preferred. Since heat is evolved when the first mixture and the organoaluminum halide are mixed, the mixing rate is adjusted as required and additional cooling is employed if necessary in order to maintain a relatively constant mixing temperature. After completing the mixing, the resulting slurry is stirred or agitated for a sufficient time, generally within a range of about 15 minutes to about 5 hours to insure that mixing of the components is complete. Thereafter, stirring is discontinued and the solid product catalyst precursor is recovered by filtration, decantation, and the like. The precursor is then washed with a suitable material such as a hydrocarbon, e.g., n-pentane, n-heptane, cyclohexane, benzene, xylenes, and the like, to remove any soluble material which may be present. The catalyst precursor is reactive and if it is to be stored before use, it must be protected against unwanted reactions and contamination.

The molar ratio of the transition metal compound in the first mixture to the organoaluminum halide can be selected over a relatively broad range. Generally, the molar ratio of the transition metal of the first mixture to the organoaluminum halide is within a range of 10:1 to 1:10, and more preferably within a range of about 2:1 to abut 1:3, since a molar ratio within the latter range usually produces an especially active olefin polymerization catalyst.

The catalyst precursor is then reacted with a halogen-containing compound of Groups IVA, IVB, and VB.

The particularly preferred halogen-containing compounds of Groups IVA, IVB, and VB are chlorine-containing compounds of Ti, Si, Ge, Sn, P, and C. Typical examples include $TiCl_4$, $COCl_2$, $PCL_3$, $SiCL_4$, $SnCl_4$, $CCL_4$, and acid chlorides of the formula $R'COCl$ where R' is an aliphatic or aromatic radical, preferably containing 1 to 20 carbon atoms.

Other suitable halogen-containing compounds include chlorosiloxanes of the formula $Si_nO_{n-1}Cl_{2n+2}$ wherein n is a number in the range of 2 to 7, for example $Si_2OCl_6$; chlorinated polysilanes having the formula $Si_nCl_{2n+2}$ where n is a number in the range of 2 to 6, such as $Si_4Cl_{10}$; chlorinated silanes having the formula $SiH_{4-n}Cl_n$ wherein n is a number in the range of 1 to 3, such as $SiHCl_3$; silanes having the formula $R'_nSiH_xCl_y$ wherein R' is an aromatic or aliphatic radical containing 1 to 20 carbon atoms, x a number in the range of 0 to 2, and y is a number in the range of 1 to 3, such as $C_2H_5SiCl_3$, $CH_3SiCl_2H$, and $(CH_3)_2SiCl_2$; alkoxyhalogensilanes of the formula $Si(OR)_{4-n}Cl_n$ wherein R is an alkyl or aryl radical having 1 to 20 carbon atoms and n is a number in the range of 1 to 3, such as $Si(OC_2H_5)Cl_3$.

In a particularly preferred embodiment, a chlorine-containing silicon compound or an organosilane is employed in combination with $TiCl_4$. Examples of the preferred silicon compounds for this embodiment include $SiCl_4$, $HSiCl_3$, $\phi SiHCl_2$, and $\phi_2 SiCl_2$, wherein $\phi$ is a phenyl radical. In this embodiment, the ratio of silicon compound to $TiCl_4$ can vary considerably; however, best results are generally obtained if the molar ratio of silicon compound to $TiCl_4$ is about 1:1.

Generally the reaction of the catalyst precursor with the halogen-containing compound can be carried out neat or in a liquid medium in which the halogen-containing source is soluble. Accordingly, the catalyst precursor is generally contacted with an inert liquid diluent containing the halogen-containing source. Any suitable inert diluent can be employed. Examples of diluents include normally liquid hydrocarbons such as n-pentane, n-heptane, cyclohexane, benzene, and xylene.

The temperature employed in this step can be selected over a relatively broad range, generally in the range of −25° C. to +250° C., preferably 0° C. to 200° C., with a temperature of about 100° C. being most preferred.

The treating time can also be selected over a broad range and generally is within the range of about 10 minutes to about 10 hours. While the weight ratio of the halogen-containing source to the catalyst precursor can be selected over a relatively broad range, the weight ratio of the halogen-containing source to the catalyst precursor is generally within a range of about 10:1 to about 1:10, more preferably from about 7:1 to about 1:4. Following the treatment of the catalyst precursor with the halogen-containing source, the surplus halogen-containing source is removed by washing the final solid catalyst with a dry (essential absence of water) liquid such as a hydrocarbon of the type previously discussed, n-hexane, or xylene for example. The resulting catalyst can be stored in the diluent or after drying, stored under dry nitrogen.

An organometallic cocatalyst or mixture of cocatalysts can be employed with the catalyst of the present invention if desired. The organometallic cocatalysts suitable for use in accordance with the invention can be selected from among the hydrides and organometallic compounds of metals of Groups IA, IIA, and IIIA of the Periodic Table. Of the organometallic cocatalysts, organoaluminum compounds are preferred, with the most preferred organoaluminum cocatalysts being compounds of the formula $R_3Al$ and $R_nAlX_{3-n}$ which include, for example, trimethylaluminum, triethylaluminum, triisopropylaluminum, tridecylaluminum, triecosylaluminum, tricyclohexyaluminum, triphenylaluminum, 2-methylpentyldiethylaluminum, and triisoprenylaluminum, ethyl aluminum dichloride, ethylaluminum sesquichloride, and diethylaluminum chloride.

The molar ratio of the organometallic compounds of the cocatalyst to the transition metal compound of the catalyst is not particularly critical and can be selected over a relatively broad range. Generally, the molar ratio of the organometallic compounds of the cocatalyst to the transition metal compound of the catalyst is within a range of about 1:1 to about 1500:1. For catalyst systems wherein the cocatalyst comprises at least one organoaluminum compound, typically about 0.25 to 15 milligrams of the titanium-containing catalyst are employed per millimole of organoaluminum cocatalyst.

If desired, at least one Lewis Base can also be employed with the organoaluminum cocatalyst. Among Lewis bases capable of appropriate addition are amines, amides, ethers, esters, ketones, arsines, phosphoramides, thioethers, aldehydes, alcoholates, amides, and salts or organic acids of metals of the first four groups of the Periodic Table. The best results, as regards both activity and stereospecificity, have been obtained using an aromatic ester or an amine. Typical examples of suitable aromatic esters include ethyl benzoate, ethyl p-methoxybenzoate (ethyl anisate), ethyl o-chlorobenzoate, ethyl naphthenate, ethyl toluate, and ethyl p-butoxybenzoate. Typical examples of suitable amines include ethyl pivalate, 2,2,6,6-tetramethylpiperidine, 1,2,4-trimethylpiperazine, and 2,5-dimethylpiperazine. The preferred Lewis base: organoaluminum molar ratio is lower than 0.8:1; when an aromatic ester or amine is used, it is generally from 0.1:1 to 0.6:1.

In one embodiment of the present invention a cocatalyst comprising triethylaluminum and ethyl anisate has been employed and has been found to give excellent results. The amount of ethyl anisate can range from about 0.1 to about 0.6 moles per mole of triethylaluminuim present.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 20 carbon atoms are most often used. Aliphatic mono-1-olefins can be copolymerized with other 1-olefins and/or with other smaller amounts of other monoolefins, alpha-methylstyrene, and similar monoolefins which do not impair the catalyst.

The catalysts of the invention are well suited for producing stereoregular polypropylene, offering potential for high rates of polymer production as well as low formation of soluble polymer.

Polymerization may be conducted in a liquid phase, in liquid monomer in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is for best results generally within a range of about 50° C. to about 102° C. and the monomer is then admitted and maintained at a partial pressure within a range of about 70 to about 725 psig for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent or solvent and unreacted monomers and drying the resulting polymer.

For optimum productivity of polymer of low solubility in the continuous polymerization of propylene, it is preferable to contact the cocatalyst comprising the organoaluminum-Lewis Base with the titanium-containing catalyst for a short period immediately prior to its being exposed to liquid propylene. It is preferable under these circumstances that the molar ratio of organoaluminum to Lewis Base in the cocatalyst be greater than 2:1.

Molecular weight of the polymer can be controlled to an extent by varying the amount of hydrogen present in the reactor during polymerization. A greater amount of hydrogen in the reactor generally produces lower molecular weight polymer. The flow properties of the polymer are in turn related to the weight average molecular weight of the polymer (Mw). Higher melt flow rates are generally associated with polymers having broad molecular weight distributions. In addition, low molecular weight polymer is usually associated with low mechanical strength.

Thus, polymers with broad molecular weight distributions which can have significant portions of the polymer which are of relatively low molecular weight often suffer from poor mechanical strength.

The invention catalyst, however, has surprisingly been found to produce polymer having high melt flow rates while having narrow molecular weight distributions. The invention catalyst also exhibits greatly increased productivity for a long period when it is employed with certain levels of hydrogen.

The amount of hydrogen generally employed in the polymerization is in the range of 0.5–200 psi.

The olefin polymers made with the catalyst of this invention are useful in preparing articles by conventional polyolefin processing techniques such as injection molding, rotational molding, extrusion of film, and the like.

A further understanding of the present invention and its advantages will be provided by the following examples illustrating a few embodiments of the invention.

EXAMPLE I

Procedure I

Preparation of Zirconium Phosphate Gel

A solution consisting of 100 ml isopropanol and 13.0 ml orthophosphoric acid (commercially available concentrated reagent) was added to a second solution consisting of 300 ml isopropanol and 57.6 g zirconium tetrabutoxide butanolate. The product gel was filtered, dried, and screened to various sized fractions. The dried zirconium phosphate gel was activated by calcining at 300° C. in air for 90 minutes. Subsequent to being calcined the zirconium phosphate gel was flushed with nitrogen.

Procedure II

Preparation of Catalyst Precursor

The following is the method used for the preparation of the various invention and comparison polymerization catalyst precursors:

A mixture of 0.7 ml $H_2O$ in 300 ml xylene was added to 3.8 g anhydrous magnesium chloride in a 9 quart beverage bottle reaction vessel under an argon atmosphere and stirred at room temperature for approximately 16 hours. At the completion of this mixing, 6.8 ml of titanium tetrabutoxide and 1.88 g phenol were added, followed by heating the mixture to 100° C. While still hot, 20 grams of a $ZrPO_4$ or other solid material were added to the reaction mixture followed by stirring for 10 minutes. At the completion of stirring, 25 ml of a 25% ethylaluminum sesquichloride solution in heptane was added to the preparation resulting in a solid catalyst precursor. The solid precursor was isolated by centrifugation and washed several times by slurrying in n-hexane followed by centrifugation until the supernatant liquid was colorless. The washed material was then isolated by vacuum filtration and the cake allowed to dry in the glove box overnight.

Procedure III

Halogen Exchange (Activation) of the Catalyst Precursor 5 g samples of the solid catalyst precursor produced by application of procedures I and II were treated with a solution containing 50 ml titanium tetrachloride, 40 ml trichlorosilane, and 10 ml silicon tetrachloride and heated to 100° C. for 1 hour. The resulting solids were isolated as in procedure II, and stored in a stoppered container in a dry, inert atmosphere until ready for testing.

Polypropylene Polymerization

Propylene polymerization were conducted in a 1 L stirred stainless steel reactor in liquid propylene for the specified residence times at 70° C. in the presence of the specified amount of hydrogen with a weighed portion of the catalyst. Catalyst weights ranged from about 25 to about 100 mg. In each run, unless otherwise specified, a cocatalyst consisting of 2.0 mmoles of triethylaluminum (TEA) and 1.1 mmoles of ethyl anisate (EA), premixed, and 2.0 mmoles of diethylaluminum chloride (DEAC) were employed. The organometal solutions were each about 0.6 molar in n-heptane.

Following polymerization, the polypropylene was recovered, stabilized and dried.

Ethylene Polymerization

Ethylene polymerization was conducted in a 2 L stirred, stainless steel reactor containing 1.25 lbs. (567 g) of isobutane diluent at the specified temperatures, times and in the presence of hydrogen, if used, to control polymer melt index. In each run unless otherwise specified, 1 mL of TEA (1 mmole TEA) as a solution in n-heptane, was used as cocatalyst. Total reactor pressure in each run was about 565 psia (3.89 MPa). Polymerization was terminated by discontinuing heating, venting gaseous reactants and recovering and drying the polyethylene produced.

EXAMPLE I

An invention catalyst was prepared as described above by employing the zinconium phosphate gel prepared in Procedure I as the solid material in Procedure II.

Samples of the invention catalyst were tested in propylene polymerizations using different reaction residence times. Table I sets out the different results obtained in the polymers produced when employing residence times ranging from 10 minutes to 4 hours. The polymerizations were performed in the presence of 15 psi hydrogen. The cocatalyst system used was that described above for propylene polymerization, i.e., 2 moles TEA, 1 mole EA and 2 moles DEAC.

TABLE I

| Run No. | Residual Time (min.) | Polymer Characteristics | | | | |
|---|---|---|---|---|---|---|
| | | Prod. (kg/g) | MF | Mw | Mn | HI |
| 1 | 10 | 3.1 | 10 | 333 | 41.3 | 8.1 |
| 2 | 30 | 3.6 | 29 | 207 | 33.8 | 6.1 |
| 3 | 60 | 5.8 | 41 | 197 | 37.3 | 5.3 |
| 4 | 90 | 7.1 | 45 | 159 | 30.5 | 5.2 |
| 5 | 180 | 12.8 | 84 | 125 | 29.0 | 4.3 |
| 6 | 240 | 17.0 | 78 | 148 | 25.1 | 5.3 |

As can be seen from the results set out in Table I, the invention catalyst increases in productivity with the longer residence times while the heterogeneity index (HI) of the polymer produced using the invention catalyst decreases.

EXAMPLE II

A second similar series of polymerizations were performed using different reactor residence times ranging from 5 minutes to 3 hours. No hydrogen was present during these runs. The results are shown in Table II.

TABLE II

| Run No. | Residual Time (min.) | Catalyst Prod. (kg/g) | Polymer Characteristics | | | |
|---|---|---|---|---|---|---|
| | | | MF | Mw | Mn | HI |
| 7 | 5 | 0.82 | 0.3 | 919 | 75.7 | 12.1 |
| 8 | 30 | 1.1 | 0.25 | 920 | 120 | 7.7 |
| 9 | 60 | 3.7 | 0.5 | 817 | 99 | 8.3 |
| 10 | 180 | 3.4 | 0.5 | 836 | 120 | 6.9 |

The results in Table II show similar trends with the use of the invention catalyst as were shown in Table I. Catalyst productivity appears to increase with longer residence times and the HI generally tends to decrease.

EXAMPLE III

Several series of propylene polymerizations were also conducted to determine the response of the invention catalyst to the amount of hydrogen present during the polymerization. One series was conducted using 30 minute residence times and varying the amount of hydrogen from none to 200 psi. Three other series were conducted using 1 hour, 2 hour, and 4 hour residence times, again varying the amount of hydrogen from none to 200 psig. The results are graphically depicted in FIG. 1. As can be seen from FIG. 1, the invention catalyst exhibited large increases in productivity when hydrogen amounts in the range of about 10 to about 50 psi were present. It is also noted that the polymerizations using longer residence times exhibited greater increases in productivity when the lower amounts of hydrogen were present than the shorter polymerizations. The 1, 2 and 4 hour polymerizations also exhibited increasing productivity when large amounts of hydrogen were used in conjunction with the invention polymerization catalyst.

Figure 2:
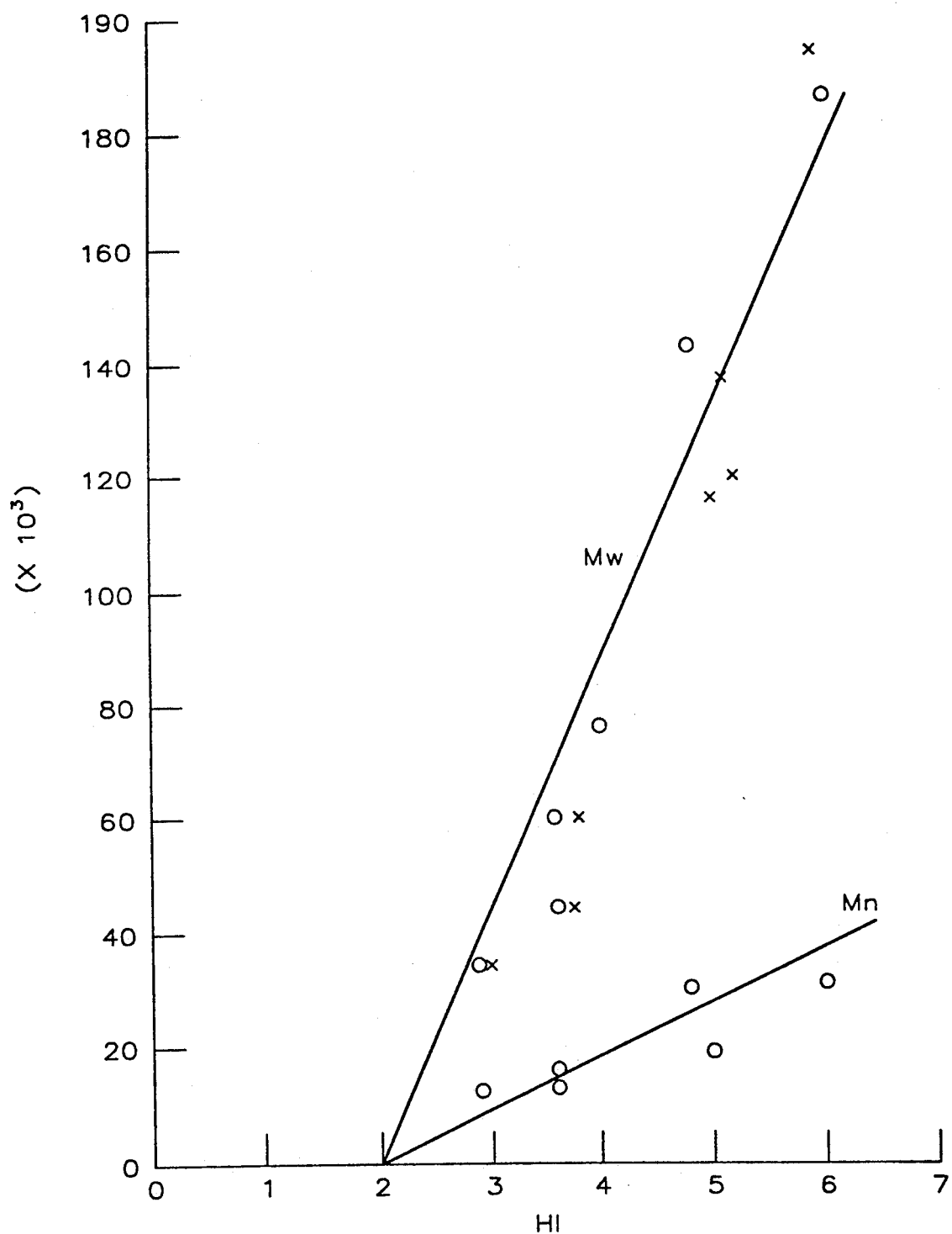
FIG. 2 graphically depicts the relationship between the amount of hydrogen used in the polymerization and the melt flow rate of the polymer.

The relationships resulting from use of the invention catalyst between Mw and HI, and Mn and HI are graphically depicted in FIG. 2. The data used to prepare FIG. 2 were collected during propylene polymerizations as described above, using invention catalysts prepared as described above with varied amounts of hydrogen and ½ hour reactor residence times. It appears that HI decreases with decreasing Mw linearly. It also appears that HI decreases linearly with decreasing Mn, however, Mw appears to have the greater effect on HI.

EXAMPLE IV

A set of propylene polymerizations was conducted using the invention catalyst and a cocatalyst system of 2 moles TEA, 1 mole 2,2,6,6,-tetramethylpiperidine (TMP) and 2 moles DEAC. Reactor residence times were 30 minutes for all runs and the amount of hydrogen employed was varied from none to 200 psig. Results are shown below in Table III.

TABLE III

| Run No. | Amt. $H_2$ (psig) | Polymer Characteristics | | | |
|---|---|---|---|---|---|
| | | Mw | Mn | HI | MF |
| 11 | 0 | 87.1[a] | 25.6 | 23.4 | —[b] |
| 12 | 5 | 928 | 77.9 | 11.9 | 14 |
| 13 | 10 | 186 | 30.9 | 6.0 | 26 |
| 14 | 20 | 143 | 29.6 | 4.8 | 35 |
| 15 | 50 | 76.1 | 19.0 | 4.0 | 238 |
| 16 | 100 | 60.1 | 16.8 | 3.6 | +[c] |
| 17 | 150 | 35.3 | 12.4 | 2.9 | + |
| 18 | 200 | 45.1 | 12.5 | 3.6 | + |

[a] Column plugged during GPC molecular weight measurements.
[b] Not measured.
[c] Too high to measure.

Figure 3:
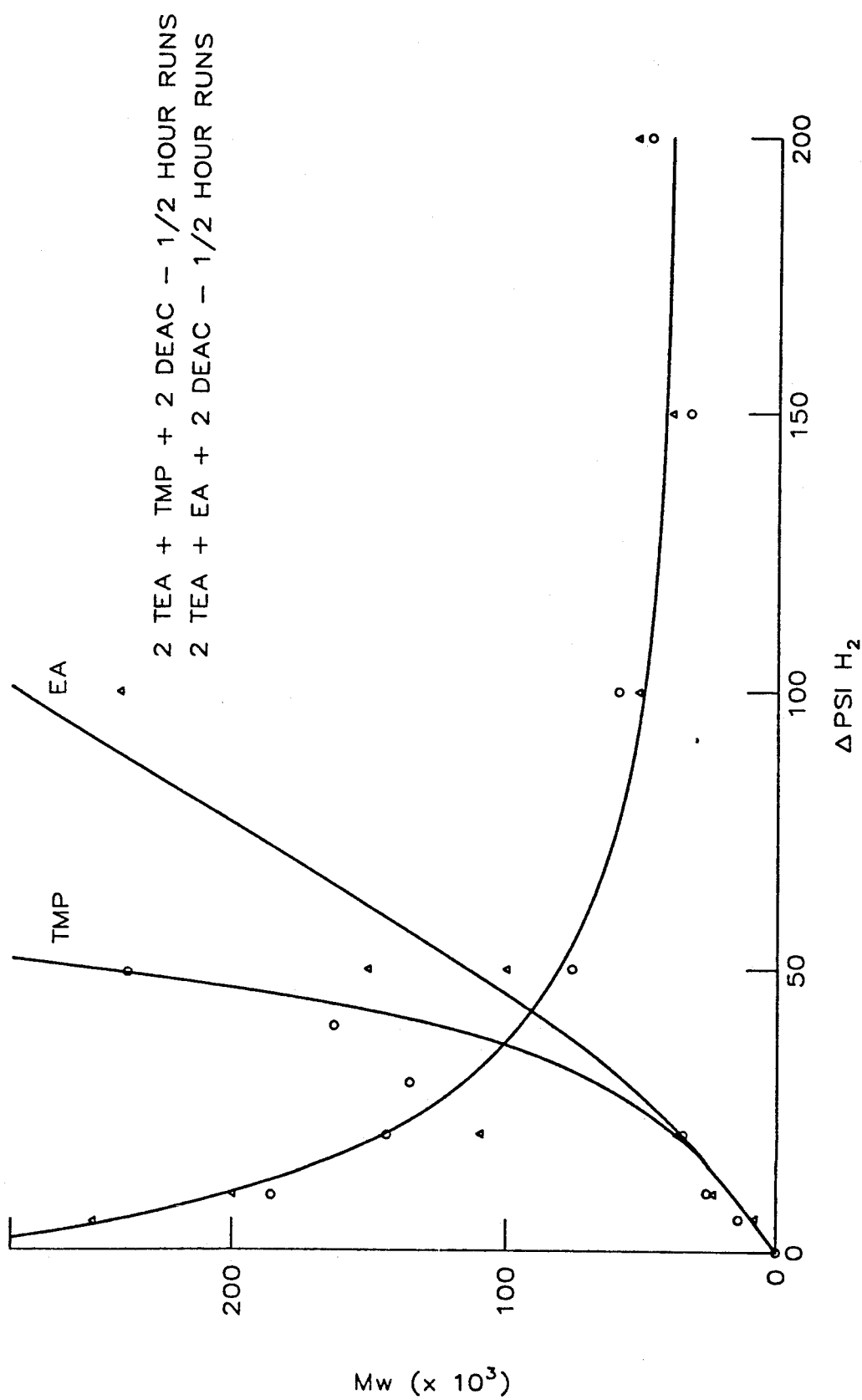
FIG. 3 graphically depicts the relationships between heterogeneity index (HI) and weight average molecular weight (Mw) and number average molecular weight (Mn) for polymers prepared by the invention catalyst.

The results from the above-described runs were compared with the results given in ½ hour polymerizations performed using the invention catalyst with a cocatalyst system of 2 mmoles TEA, 1.1 mmoles EA and 2 mmoles DEAC. The results are depicted in FIG. 3. The relationship between Mw and the amount of hydrogen in the reactor is plotted for the two sets of polymerizations. The cocatalyst system which employs TMP appears to have been more responsive to hydrogen since Mw increases more rapidly at lower hydrogen concentrations than in the polymerizations using EA in the cocatalyst.

FIG. 3 also depicts the relationship between MF and the amount of hydrogen in the reactor for the two sets of polymerizations. It is noted that the two different cocatalyst systems result in essentially the same curve.

Figure 4:
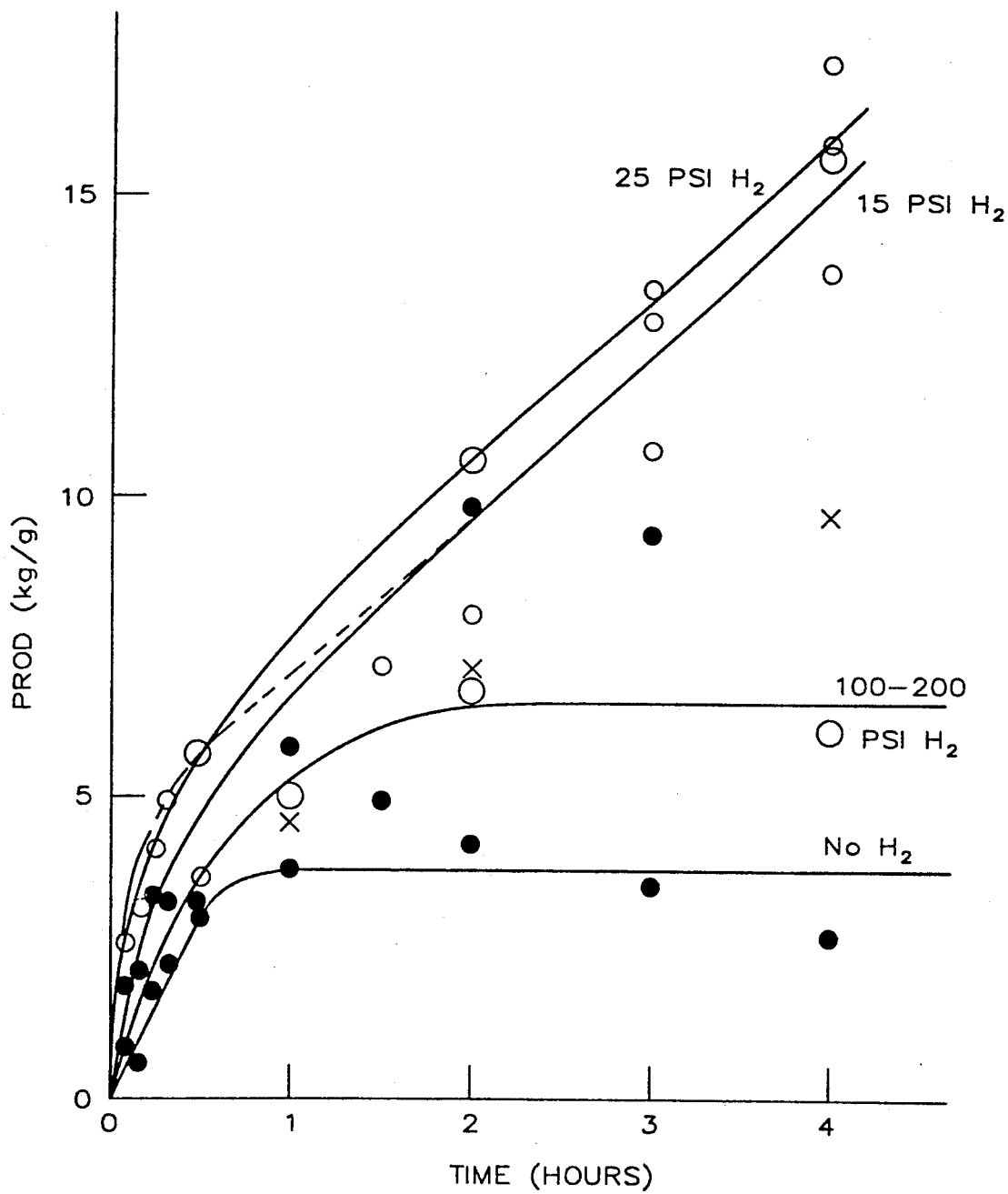
FIG. 4 graphically depicts the relationship between polymerization reaction time and productivity of the invention catalyst at various levels of hydrogen in the reactor.

The effect of reactor residence time on catalyst productivity was also investigated. Propylene polymerizations were conducted, using the TEA/TMP/DEAC cocatalyst system, for different amounts of time, ranging from 5 minutes to 4 hours. The amount of hydrogen used was also varied to see the effects of both time and hydrogen content on catalyst productivity. The results are graphically depicted in FIG. 4. It can be seen that when no hydrogen is present, the catalyst maintains a constant productivity for residence times of about 1 hour and greater. A similar behavior is observed when the amount of hydrogen is from about 100–200 psi for 2 hours and greater. However, for lower amounts of hydrogen (e.g., 15 and 25 psi), the productivity continues to rise with longer reactor residence times.

EXAMPLE V

This example demonstrates the preparation of an invention catalyst made in the presence of a $ZrPO_4$ containing nickel.

A Ni-Zr phosphate gel, calculated atom ratios of Ni/Zr of 1:1 and P/Ni+Zr of 1:1, was prepared by adding a hot aqueous solution containing 1.2 moles of $(NH_4)_2HPO_4$ to hot aqueous solution containing 0.6 mole each of $Ni(NO_3)_2.6H_2O$ and $ZrOCl_2.4H_2O$. The gel was filtered, the cake was washed with several portions of water and the product was dried in an oven for 12 hours at 100° C. Individual portions of the dried gel were then calcined for 6 hours in a muffle furnace in air at the temperature indicated below, then ground to less than 20 mesh in size.

19S: 250° C.
20S: 350° C.
21S: 450° C.
22S: 550° C.

A series of catalysts were produced in the presence of a calcined, particulate materials as follows: under argon in separate 1 quart (0.9 L) beverage bottles was charged 0.04 mole of particulate $MgCl_2.0.008\ H_2O$, 0.04 mole of $H_2O$ and 300 mL of reagent quality mixed xylenes. Each mixture was stirred for about 3 days at 23° C., then to each bottle was added 0.02 mole of titanium tetra-n-butoxide $(Ti(OBu)_4)$ and 0.02 mole of phenol. With continued stirring, each mixture was heated at 100° C. for 1 hour to obtain a solution and to each solution was added 20 g of the desired $Ni.ZrPO_4$ material. Each mixture was stirred 10–15 minutes as it was allowed to cool to about 23° C. Then it was treated dropwise with 25 mL (0.01 mole) of ethylaluminum sesquichloride (EASC) as a 25 weight percent solution in n-heptane to produce a composition which settled quickly when stirring ceased. For convenience, these compositions are designated catalyst precursors A. Each precursor was isolated by centrifugation, washed with n-hexane to remove unreacted and/or soluble by-products and dried by standing overnight in the dry, argon-filled glove box. A 5 g portion of each precursor A was activated for polymerization by treatment for 1 hour at 100° C. with about 30 mL of a 3-component halide mixture consisting of 50 volume percent $TiCl_4$, 40 volume percent $HSiCl_3$ and 10 volume percent $SiCl_4$. The corresponding weight ratio of mixed halides to initial $MgCl_2$ used in preparing precursor A was about 10:1. The resulting compositions were isolated by suction filtration, washed with n-hexane and dried as before to obtain the reddish-brown catalysts as particulate solids.

The weights and calcining temperature employed in producing each support, the weights of precursor A and catalyst made therefrom are given in Table IVA.

TABLE IVA

Supported Catalyst Precursors and Isolated Catalysts Thereof
Ni—Zr $PO_4$ gel

| Catalyst No. | No. | Calcining Temp. °C. | Atom Ratio Ni/Zr | Precursor A Wt. g | Isolated Catalyst[a] Wt. g |
|---|---|---|---|---|---|
| 19 | 19S | 250 | 1:1 | 25.1 | 4.8 |
| 20 | 20S | 350 | 1:1 | 25.8 | 4.9 |
| 21 | 21S | 450 | 1:1 | 26.2 | 5.0 |
| 22 | 22S | 550 | 1:1 | 25.1 | 4.9 |

[a]From 5 g portion of corresponding precursor A.

A weighed portion of each catalyst in Table IVA was employed in propylene polymerization for 1 hour at 70° C. in a 1 L stirred, stainless steel reactor in liquid propylene. Each run was conducted in the presence of 25 psi hydrogen and a cocatalyst consisting of 2.0 mmoles of triethylaluminum (TEA) premixed with 1.1 mmoles of ethyl anisate (EA) and 2.0 mmoles of diethylaluminum chloride (DEAC). The organometal solutions were each about 0.6 molar in n-heptane.

Following polymerization, the polypropylene in the reactor was recovered, stabilized with conventional antioxidants and dried. Propylene solubles, xylene solubles, calculated productivity, melt flow and flexural modulus were determined as set forth in earlier related inventions. The results obtained are given in Table IVB.

TABLE IVB

Propylene Polymerization

| Cat. No. | Catalyst Weight, mg | Calculated Prod./ kg/g/hr[a] | Wt. % Solubles Propylene | Wt. % Solubles Xylene | Melt Flow g/10 min. | Flex. Mod. MPa |
|---|---|---|---|---|---|---|
| 19 | 36.3 | 1.64 | 2.1 | 3.5 | 17.2 | 1520 |
| 20 | 36.7 | 2.61 | 1.3 | 3.4 | 8.0 | 1600 |
| 21 | 49.1 | 3.28 | 0.9 | 4.1 | 4.3 | 1502 |
| 22 | 29.7 | 2.20 | 3.4 | 12.1 | 16.7 | 1001 |

[a]Based on polymer recovered from reactor excluding propylene-soluble polymer.

The results in Table IVB show the invention catalysts based on calculated productivity values for the whole catalyst to be quite active in propylene polymerization. The optimum calcining temperature for the Ni-Zr phosphate material having an atom ratio of Ni/Zr of 1:1 falls in the 350°–450° C. range. Below this temperature range a moderate decline in catalyst activity results while little effect on polymer solubles is noted. Above the temperature range a small decline in catalyst activity is observed but a substantial increase in soluble polymer, particularly xylene-soluble polymer is noted. This effect is reflected in the drop in the flexural modulus from the 1500–1600 MPa values obtained with the polymer produced with catalysts 1–3 to about 1000 MPa for the polymer made with catalyst 20. The results suggest that the relatively large amount of xylene-soluble polymer made with catalyst 20 may be amorphous or less crystalline than the remaining polymer resulting in the precipitous drop in flexural modulus shown.

EXAMPLE VI

A series of Ni-Zr phosphate gels having a constant atom ratio of P/Ni+Zr but a variable Ni/Zr atom ratio was prepared in a similar manner to the Ni-$ZrPO_4$ material of Example V. In this series, an aqueous solution containing 0.2 mole of $Ni(NO_3)_2.6H_2O$ was mixed with an aqueous solution containing sufficient $ZrOCl_2.4H_2O$ to provide the desired Ni/Zr atom ratio. The quantity of Zr salt in the solutions ranged from 0.02 to 0.50 mole. Each mixture was then admixed with an aqueous solution containing $(NH_4)_2HPO_4$ equal in mole fraction, e.g., 0.25 mole, to the mole fraction sum of the Ni and Zr salts, e.g., 0.25 mole. Each resulting gel was isolated, washed once with 600 mL of water, dried as before and calcined for 4 hours in air at 450° C. The Ni/Zr atom ratios of the materials are tabulated below.

| | Pore Vol. cc/g | Surface Area $m^2/g$ |
|---|---|---|
| Solid 23S, Ni/Zr atom ratio of 4:1 | 0.11 | 38 |
| Solid 24S, Ni/Zr atom ratio of 2:1 | 0.32 | 86 |
| Solid 25S, Ni/Zr atom ratio of 1.3:1 | not determined | |
| Solid 26S, Ni/Zr atom ratio of 0.8:1 | not determined | |
| Solid 27S, Ni/Zr atom ratio of 0.7:1 | 0.31 | 108 |
| Solid 28S, Ni/Zr atom ratio of 0.5:1 | 0.36 | 79 |
| Solid 29S, Ni/Zr atom ratio of 0.4:1 | not determined | |

All pore volumes and surface areas in this and other examples were determined by mercury porosimitry in accordance with the procedure described by American Instrument Company, Silver Springs, Mo., catalog number 5-7125-B.

All calcined solids in Examples VI, VII, and VIII were ground to less than 20 mesh in size.

Catalyst precursors and catalysts therefrom were prepared in the presence of 20 g of each solid in the manner described in Example V.

The Ni/Zr atom ratio of each solid, the weights of precursor A and catalysts thereof and the calculated weight percent fraction of each catalyst are presented in Table VA.

TABLE VA

Catalyst Precursors and Catalysts
Solid

| Catalyst No. | No. | Atom Ratio Ni/Zr | Precursor A Wt. g | Isolated Catalyst[a] Wt. g |
|---|---|---|---|---|
| 23 | 23S | 4:1 | 23.2 | 4.97 |
| 24 | 24S | 2:1 | 23.7 | 5.12 |
| 25 | 25S | 1.3:1 | 21.8 | 4.90 |
| 26 | 26S | 0.8:1 | 21.3 | 5.00 |
| 27 | 27S | 0.7:1 | 21.9 | 4.95 |
| 28 | 28S | 0.5:1 | 22.0 | 4.40 |
| 29 | 29S | 0.4:1 | 23.2 | 4.80 |

[a]From 5 g portion of corresponding precursor A.

A weighed portion of each catalyst was employed in propylene polymerization as described in Example V. The results obtained are given in Table VB.

TABLE B

Propylene Polymerization

| Cat. No. | Weight, mg Cat. | Calculated Prod., kg/g/hr[a] | Wt. % Solubles Propylene | Wt. % Solubles Xylene | Melt Flow g/10 min. | Flex. Mod. MPa |
| --- | --- | --- | --- | --- | --- | --- |
| 23 | 118.8 | 1.46 | 0.6 | 3.6 | 33 | 1611 |
| 24 | 146.7 | 0.652 | 3.0 | 4.2 | 10 | 1459 |
| 25 | 165.5 | 0.377 | 1.5 | 10.3 | 31 | 858 |
| 26 | 133.1 | 0.276 | 4.9 | 5.0 | 33 | 1415 |
| 27 | 149.0 | 1.01 | 1.0 | 10.8 | 24 | 1142 |
| 28 | 126.1 | 0.468 | 4.9 | 6.2 | 23 | 1433 |
| 29 | 94.2 | 1.11 | 1.6 | 4.1 | 27 | 1632 |

[a]Based on polymer recovered from reactor excluding propylene-soluble polymer.

The varied productivity results report in Table VB indicate the active propylene polymerization catalysts are made in the presence of cogelled Ni-Zr phosphate xerogels wherein the atom ratio of Ni to Zr can vary from at least 4:1 to 0.4:1. The generally high melt flows, generally in the 20–30 range, suggest that the catalysts are quite responsive to the presence of hydrogen in the reactor as a molecular weight modifier. Catalysts 25 and 27 made more than 10 weight percent xylene-soluble polymer whereas those catalysts on either side and catalyst 26 in the middle made much less xylene-soluble polymer. The presence of the soluble polymer also contributed to the relatively low flexural modulus values of 858 and 1142 MPa, respectively, exhibited by the molded polymer specimens. The reason for the anomalous behavior is not known.

EXAMPLE VII

A series of catalysts was prepared in the manner described in Example V employing, however, 20 g each of solid materials selected from Fe/Co/Zr/PO$_4$, Ni/Co/Zr/PO$_4$ and V/Co/Zr/PO$_4$. The solids were prepared as before by precipitating the transition metal-containing phosphate gels from an aqueous solution containing the dissolved transition metal salts with an aqueous solution of (NH$_4$)$_2$HPO$_4$. The gels were washed with water, dried, and calcined in air.

Solid 30S was prepared from 0.108 mole of FeSO$_4$.7H$_2$O, 0.124 mole of Co(NO$_3$)$_2$.6H$_2$O and 0.348 mole of ZrOCl$_2$.4H$_2$O with 0.758 mole of (NH$_4$)$_2$HPO$_4$. The calculated atom ratio of Fe+Co to Zr was about 0.7:1 and the calculated atom ratio of P to Fe+Co+Zr was about 1.3:1. The gel was calcined for 4 hours in air at 500° C. Pore volume=0.28 cc/g, surface area=120 m$^2$/g. Solid 31S was prepared from 0.114 mole of Ni(NO$_3$)$_2$.6H$_2$O, 0.127 mole of Co(NO$_3$)$_2$.6H$_2$O and 0.354 mole of ZrOCl$_2$.4H$_2$O with 0.802 mole of (NH$_4$)$_2$HPO$_4$. The calculated atom ratio of Ni+Co to Zr was about 0.7:1 and the calculated atom ratio of P to Ni+Co+Zr was about 1.3:1. The gel was calcined for 4 hours in air at 500° C. Pore volume was 0.18 cc/g and surface area was 49.6 m$^2$/g.

A V/Co/Zr/PO$_4$ gel was prepared from 0.190 mole of VOSO$_4$.5H$_2$O, 0.247 mole of Co(NO$_3$)$_2$.6H$_2$O and 0.695 mole of ZrOCl$_2$.4H$_2$O with 1.51 moles of (NH$_4$)$_2$HPO$_4$. The calculated atom ratios were V+Co/Zr of about 0.6:1 and P to V+Co+Zr of about 1.3:1. The gel was dried and divided into 4 portions. Each portion was calcined for 4 hours in air as follows: solid 32S°–350° C., solid 33S°–400° C., solid 34S°–450° C. and solid 35S°–500° C.

The transition metals used, weights of precursor A and catalysts thereof are set forth in Table VI.

The pore volume of 35S was 0.87 cc/g and the surface area was 64 m$^2$/g. It is believed that 32S, 33S, and 34S are similar in pore volume and surface area to those measured for 35S.

TABLE VIA

| Catalyst No. | ZrPO$_4$-Containing Solid No. | Type | Calcining Temp. °C. | Precursor A Wt. g | Isolated Catalyst[a] Wt. g |
| --- | --- | --- | --- | --- | --- |
| 30 | 30S | Fe/Co/Zr | 500 | 23.9 | 3.8 |
| 31 | 31S | Ni/Co/Zr | 500 | 20.1 | 4.6 |
| 32 | 32S | V/Co/Zr | 350 | 25.7 | 4.8 |
| 33 | 33S | V/CoZr | 400 | 25.7 | 4.5 |
| 34 | 34S | V/Co/Zr | 450 | 25.3 | 4.9 |
| 35 | 35S | V/Co/Zr | 500 | 25.0 | 4.9 |

[a]From 5 g portion of corresponding precursor A.

A weighed portion of each catalyst was employed in propylene polymerization as described in Example V. The results obtained are presented in Table VIB.

TABLE VIB

Propylene Polymerization

| Cat. No. | Weight, mg Cat. | Calculated Prod., kg/g/hr[a] | Wt. % Solubles Propylene | Wt. % Solubles Xylene | Melt Flow g/10 min. | Flex. Mod. MPa |
| --- | --- | --- | --- | --- | --- | --- |
| 30 | 124.1 | 0.362 | 3.2 | 2.6 | 66 | 1608 |
| 31 | 91.9 | 1.92 | 1.8 | 7.2 | 34 | 1242 |
| 32 | 125.8 | 1.04 | 2.1 | 8.0 | 60 | 1310 |
| 33 | 135.6 | 0.444 | 5.8 | 6.9 | 103 | 1466 |
| 34 | 90.3 | 1.23 | 2.5 | 4.7 | 49 | 1476 |
| 35 | 133.0 | 0.255 | 4.8 | 4.3 | —[b] | — |

[a]Based on polymer recovered from reactor excluding propylene-soluble polymer.
[b]A dash signifies not determined.

The productivity results given in Table VIB indicate that active catalysts can be made in the presence of the various transition metal-containing phosphate xerogels. Except for catalyst 33 supported on a Ni/Co/Zr/PO$_4$ xerogel, the remaining catalysts appear to be even more responsive to hydrogen in the reactor, in view of the melt flow values of about 50 or higher, than the catalysts of Example VI wherein Ni/Zr/PO$_4$ materials were used in the catalyst preparation.

EXAMPLE VIII

A series of catalysts was prepared in the manner described in Example VI employing, however, 20 g each of a Cu/Zr/PO$_4$ gel. The gels were prepared, washed, dried, and calcined in air in the manner previously outlined in Example VII.

Gel A was prepared from 0.200 mole of Cu(N$_3$)$_2$.2½H$_2$O, 0.300 mole of ZrOCl$_2$.4H$_2$O and 0.500 mole of (NH$_4$)$_2$HPO$_4$. The calculated atom ratio of Cu to Zr was about 0.7:1 and the calculated atom ratio of P to Cu+Zr was about 1:1. The recovered, dried gel was divided into 2 portions. Portion 1, solid 36S, was calcined for 4 hours in air at 500° C. Portion 2, solid 37S, was calcined for 4 hours in air at 300° C.

Gel B was prepared from 0.200 of Cu(NO$_3$)$_2$.2½H$_2$O, 0.400 mole of ZrOCl$_2$.4H$_2$O and 0.600 mole of (NH$_4$)$_2$HP)$_4$. The calculated atom ratios were: Cu to Zr of about 0.5:1 and P to Cu+Zr of about 1:1. The recovered, dried gel was also divided into 2 portions. Portion 1, solid 38S, was calcined for 4 hours in air at 500° C. Portion 2, solid 39S, was calcined for 4 hours in air at 300° C.

The pore volume of solid 38S was determined to be 1.05 cc/g and the surface area was 73 mL$^2$/g; it is believed solids 36S, 37S, and 39S had about the same pore volume and surface area as 38S.

The atom ratios of Cu and Zr used, weights of precursor A and catalysts thereof are given in Table VII.

TABLE VIIA

| | Catalyst Precursors and Catalysts | | | |
|---|---|---|---|---|
| | ZrPO$_4$-Containing Solid | | | Isolated |
| Cat. No. | No. | Atom Ratio Cu/Zr | Calcining Temp. °C. | Precursor A Wt. g | Catalyst[a] Wt. g |
| 36 | 36S | 0.7:1 | 500 | 21.3 | 4.8 |
| 37 | 37S | 0.7:1 | 300 | 25.3 | 5.3 |
| 38 | 38S | 0.5:1 | 500 | 25.9 | 5.0 |
| 39 | 39S | 0.5:1 | 300 | 23.4 | 5.1 |

[a]From 5 g portion of corresponding precursor A.

A weighed portion of each catalyst was employed in propylene polymerization as described in Example V. The results obtained are reported in Table VIIB.

TABLE VIIB

| | Propylene Polymerization | | | | | |
|---|---|---|---|---|---|---|
| Cat. No. | Weight, mg Cat. | Calculated Prod., kg/g/hr[a] | Wt. % Solubles Propylene | Xylene | Melt Flow g/10 min. | Flex. Mod. MPa |
| 36 | 206.8 | 0.427 | 2.7 | 4.1 | 42 | 1557 |
| 37 | 129.4 | 0.988 | 2.5 | 6.3 | 27 | 1432 |
| 38 | 105.4 | 1.19 | 1.8 | 3.8 | 56 | 1365 |
| 39 | 153.9 | 0.276 | 5.3 | 4.5 | 77 | 1310 |

The data reported in Table VIIB demonstrate that Cu/Zr/PO$_2$ xerogels can be successfully employed in the preparation of the catalyst of this invention. The results suggest that a solid having a Cu/Zr atom ratio of about 0.7:1 (catalyst 36) results in a catalyst having a greater activity than when a solid having a Cu/Zr ratio of about 0.5:1 (catalyst 38) is used. The results also suggest, in comparing productivity values of catalyst 36 with catalyst 37 and productivity values of catalyst 38 with catalyst 39, that the solids calcined at 500° C. give more active catalysts than those calcined at 300° C.

The various catalysts are also responsive to hydrogen based on melt flows ranging from 27 to 77 g/10 min.

EXAMPLE IX

A catalyst (catalyst 40) was prepared in a manner similar to the preparation of catalyst 23 except that the Ni/ZrPO$_4$ gel was prepared in the presence of sulfate ions.

An 87 g (0.3 moles) sample of nickel nitrate hexahydrate, Ni(NO$_3$)$_2$.6H$_2$O, from Mallinkrodt and a 75.2 g (0.3 moles) sample of ZrOCl$_2$.4H$_2$O from Alpha were dissolved in 700 ccs of hot water while stirring, to form a solution.

Then 80.04 g (0.6 moles) of (NH$_4$)$_2$HPO$_4$ and 39.6 g (0.3 moles) of (NH$_4$)$_2$SO$_4$, both obtained from Fischer, were dissolved in 300 ccs warm water with stirring to form another solution.

The two solutions were then mixed with stirring at approximately 69° C. for 30 minutes. A green gel was formed. The mixture was filtered and the solid gel was washed with 500 mL of distilled water, then was transferred to a beaker containing 750 mL of distilled water. The contents of the beaker were stirred while heating to 65° C. for 1½ hours. The contents were then removed and filtered to recover the gel, which was dried in a 120° C. vacuum oven overnight.

The dried gel was then removed from the oven and calcined at 450° C. for 4 hours, followed by grinding to obtain a powder. The yield of powder was 80.3 g.

A 20 g sample of the above-prepared ZrPO$_4$ material was employed in the preparation of catalyst 40 as described in Example V. A comparison of the Ni/Zr atom ratio of the solid, the weights of precursor and catalysts prepared therefrom are presented in Table VIIIA for catalysts 23 and 40. Catalyst 23 was prepared identically to catalyst 40 except that the ZrPO$_4$ solid used in the preparation of catalyst 40 was prepared in the presence of SO$_4{}^{2-}$ ions.

TABLE VIIIA

| | Catalyst Precursors and Catalysts | | | |
|---|---|---|---|---|
| | ZrPO$_4$-Containing Solid | | | Isolated |
| Catalyst No. | No. | Atom Ratio Ni/Zr | Precursor A Wt. g | Catalyst[a] Wt. g |
| 23 | 21S | 4:1 | 23.2 | 4.97 |
| 40 | 38S | 4:1 | 25.7 | 4.6 |

[a]From 5 g portion of corresponding precursor A.

A weighed portion of catalyst 40 was employed in propylene polymerization as described in Example V. The results obtained are given in Table VIIIB along with the results shown for catalyst 23 when it was employed in an essentially identical polymerization.

TABLE VIIIB

| | Propylene Polymerization | | | | |
|---|---|---|---|---|---|
| Cat. No. | Weight, mg Cat. | Calculated Prod., kg/g/hr[a] | Wt. % Solubles Propylene | Xylene | Melt Flow g/10 min. |
| 23 | 118.8 | 1.46 | 0.6 | 3.6 | 33 |
| 40 | 35.9 | 3.74 | 1.6 | 4.5 | 43.6 |

[a]Based on polymer recovered from reactor excluding propylene-soluble polymer.

Table VIIIB demonstrates that the presence of SO$_4{}^{2-}$ ions during the ZrPO$_4$ solid preparation results in a catalyst with higher productivity than one that is prepared without the SO$_4{}^{2-}$ ions. It is noted that use of the SO$_4{}^{2-}$ containing solid produced slightly more soluble polymer; however, the SO$_4{}^{2-}$ containing solid was observed to produce polymer crystal-like particles which grew large but had poor crush strength and thus fell apart upon handling the polymer.

While this invention has been described in detail for the purpose of illustration, it is not meant to be limited thereby, but is intended to cover all reasonable modifications within the spirit and scope of the invention.

That which is claimed is:

1. A process for the polymerization of alpha-olefins containing from 2 to 20 carbon atoms which comprises contacting at least one of said alpha-olefins under polymerization conditions with a catalyst prepared by
   (a) contacting at least one metal dihalide selected from the group consisting of Group IIA and IIB dihalides, with at least one transition metal compound consisting of Group IVB metal compounds in the presence of a diluent under conditions suitable for the formation of a soluble complex;
   (b) contacting the soluble complex produced in accordance with step (a) with about 1 to about 99 wt. percent based on said soluble complex of a particulate material comprising zirconium phosphate to produce a first mixture;

(c) contacting said first mixture with an organoaluminum halide to produce a solid catalyst precursor;

(d) contacting said catalyst precursor with halogen-containing compound selected from the group consisting of:

TiX$_4$,

SiX$_4$,

SiHX$_3$, and mixtures thereof wherein X is a halogen atom.

2. A process in accordance with claim 1 wherein said transition metal compound is a titanium tetrahydrocarbyloxide of the formula Ti(OR)$_4$, wherein each R is independently selected from the group consisting of carbon radicals having 1 to 20 carbon atoms.

3. A process in accordance with claim 1 wherein said particulate material further comprises other transition metal ions selected from Groups IVB-VIB, IB, and IIB of the Periodic Table.

4. A process in accordance with claim 1 wherein said particulate material is prepared in the presence of sulfate ions.

5. A process in accordance with claim 1 wherein said olefin polymerization catalyst is employed with a cocatalyst comprising at least one organoaluminum compound, wherein the molar ratio of said cocatalyst to transition metal compound of said catalyst is in the range of 1:1 to 1500:1.

6. A process in accordance with claim 5 wherein said cocatalyst further comprises a Lewis Base selected from the group consisting of aromatic esters and amines, wherein the molar ratio of said Lewis Base to said organoaluminum in said cocatalyst is in the range of 0.1:1 to 0.6:1.

7. A process in accordance with claim 6 wherein said Lewis Base is selected from the group consisting of:

ethyl benzoate, ethyl anisate, and 2,2,6,6-tetramethylpiperidine.

8. A process in accordance with claim 1 wherein hydrogen is present during the polymerization.

9. A process in accordance with claim 8 wherein said hydrogen is present in an amount in the range of 20-40 psi.

* * * * *